SAMUEL P. TIFT.
Improvement in Saw-Frames.
No. 127,387.                                                               Patented May 28, 1872.
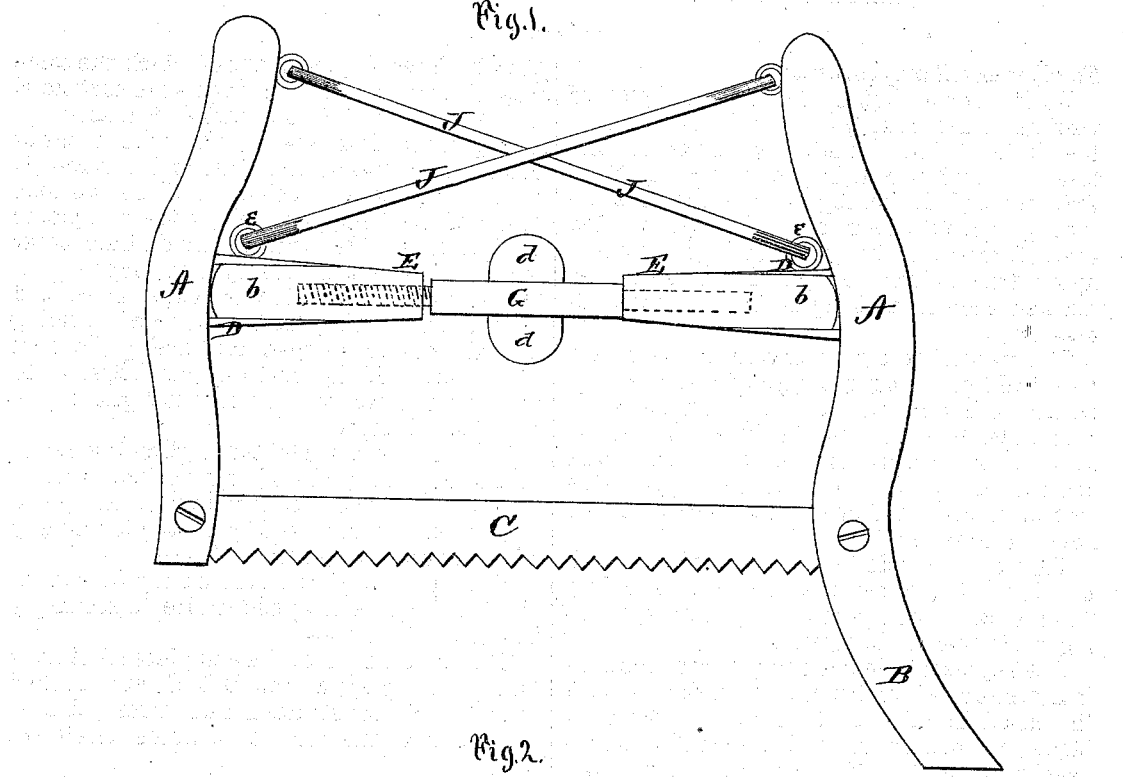
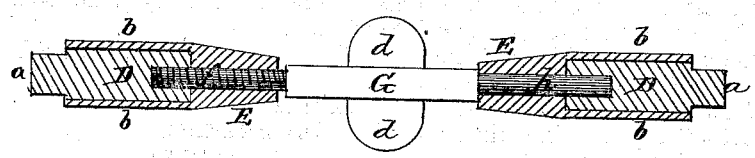
Witnesses:
Inventor.
Attorneys.

UNITED STATES PATENT OFFICE.

SAMUEL P. TIFT, OF GROTON, CONNECTICUT.

IMPROVEMENT IN SAW-FRAMES.

Specification forming part of Letters Patent No. 127,387, dated May 28, 1872.

*To all whom it may concern:*

Be it known that I, SAMUEL P. TIFT, of Groton, in the county of New London and in the State of Connecticut, have invented certain new and useful Improvements in Saw-Frames; and do hereby declare that the following is a full, clear, and exact description thereof, reference being had to the accompanying drawing and to the letters of reference marked thereon making a part of this specification.

The nature of my invention consists in a "central tightening apparatus for wood-saws," as will be hereinafter more fully set forth.

In order to enable others skilled in the art to which my invention appertains to make and use the same, I will now proceed to describe its construction and operation, referring to the annexed drawing, in which—

Figure 1 is a side view of a wood-saw with my tightening apparatus attached; and Fig. 2 is a view of the tightening apparatus, showing parts thereof in section.

A A represent the two end pieces of the saw-frame, one of which is provided or formed with the usual handle B. C represents the saw-blade fastened in the end pieces A A in the usual manner. The tightening apparatus consists of two wooden blocks, D D, provided with tenons $a\ a$ for insertion in mortises made at the center in the inner sides of the end pieces A A. In grooves on each block D are placed jaws or lips $b\ b$, projecting from a metal socket, E, situated at the end of the block. G is a square shaft of any suitable dimensions, provided on two sides with ears or thumb-pieces $d\ d$, by means of which the same may be turned in its bearings—the sockets E E. At one end of the shaft G is a screw, $f$, fitting in female-screw threads made in one of the sockets, and at the other end is a rod, $h$, fitting in the other socket. J J are two rods attached to the upper ends of the end pieces A A, and provided with hooks on their outer ends, which fasten into eyes or loops $e\ e$, on the blocks D D, at the opposite sides, said rods thus crossing each other and forming draft-braces for the saw. By turning the shaft G, by means of the thumb-pieces $d\ d$, so as to unscrew the screw $f$, the saw is tightened to any desired degree.

The various parts of this tightening apparatus may be made of any desired form or shape to suit the manufacturer; and the entire apparatus can readily be applied to any of the saws now generally in use.

Having thus fully described my invention, what I claim as new, and desire to secure by Letters Patent, is—

The combination of the end pieces A A, saw C, tightening apparatus D E G, and hooked rods J J, all constructed and arranged substantially as and for the purposes herein set forth.

In testimony that I claim the foregoing I have hereunto set my hand this 5th day of April, 1872.

SAMUEL P. TIFT.

Witnesses:
ASA PERKINS, 2d,
SUBOD PERKINS.